(12) United States Patent
Priego Porcuna et al.

(10) Patent No.: US 10,873,646 B1
(45) Date of Patent: Dec. 22, 2020

(54) SYSTEMS AND METHODS FOR PROVIDING CONTENT

(71) Applicant: Facebook, Inc., Menlo Park, CA (US)

(72) Inventors: Maria Dolores Priego Porcuna, New York, NY (US); FNU Hendri, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/986,545

(22) Filed: May 22, 2018

Related U.S. Application Data

(60) Provisional application No. 62/646,683, filed on Mar. 22, 2018.

(51) Int. Cl.
   *G06F 15/16* (2006.01)
   *H04L 29/08* (2006.01)
   *G06F 9/48* (2006.01)

(52) U.S. Cl.
   CPC .......... *H04L 67/2847* (2013.01); *G06F 9/485* (2013.01); *H04L 67/2852* (2013.01); *G06F 2209/482* (2013.01)

(58) Field of Classification Search
   CPC . H04L 67/2847; H04L 67/2852; G06F 9/485; G06F 2209/482
   USPC .......................................................... 709/232
   See application file for complete search history.

(56) References Cited

U.S. PATENT DOCUMENTS

| | | | |
|---|---|---|---|
| 8,938,488 B1* | 1/2015 | Sayed | H04L 9/0872 709/201 |
| 10,313,213 B1* | 6/2019 | Aygun | H04L 43/08 |
| 2014/0373032 A1* | 12/2014 | Merry | G06F 9/54 719/328 |
| 2015/0350807 A1* | 12/2015 | Andrews | H04W 76/14 455/414.2 |
| 2016/0092945 A1* | 3/2016 | Stahl | H04L 12/4625 705/7.29 |
| 2019/0230186 A1* | 7/2019 | Yellin | H04L 67/2847 |

\* cited by examiner

*Primary Examiner* — Michael Won
*Assistant Examiner* — Karina J Garcia-Ching
(74) *Attorney, Agent, or Firm* — Sheppard Mullin Richter & Hampton LLP

(57) ABSTRACT

Systems, methods, and non-transitory computer-readable media can determine that a software application running on a computing device has been backgrounded. A determination is made that one or more prefetch criteria is satisfied. A request to prefetch one or more content items for the software application is generated based on determination that the one or more prefetch criteria is satisfied.

18 Claims, 7 Drawing Sheets

400

Determine that a software application running a computing device has been backgrounded
402

Determine that one or more prefetch criteria is satisfied
404

Generate a request to prefetch one or more content items for the software application based on determination that the one or more prefetch criteria is satisfied
406

FIGURE 4

SYSTEMS AND METHODS FOR PROVIDING CONTENT

CROSS-REFERENCE TO RELATED APPLICATIONS

This application claims priority to U.S. Provisional Patent Application No. 62/646,683, filed on Mar. 22, 2018 and entitled "SYSTEMS AND METHODS FOR PROVIDING CONTENT," which is incorporated herein by reference in its entirety.

FIELD OF THE INVENTION

The present technology relates to the field of content distribution. More particularly, the present technology relates to techniques for distributing content to users in a computer networking environment.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine that a software application running on a computing device has been backgrounded. A determination is made that one or more prefetch criteria is satisfied. A request to prefetch one or more content items for the software application is generated based on determination that the one or more prefetch criteria is satisfied.

In an embodiment, the request to prefetch one or more content items for the software application comprises a request to prefetch a plurality of content items for a plurality of feeds associated with the software application.

In an embodiment, the prefetch criteria comprise a minimum background time threshold specifying a minimum amount of time the software application must be backgrounded.

In an embodiment, the minimum background time threshold is computed dynamically based on user characteristics.

In an embodiment, the minimum background time threshold is computed dynamically based on a computation of an average amount of time between active sessions on the software application for a user.

In an embodiment, computation of the average amount of time excludes outlier periods of inactivity.

In an embodiment, the prefetch criteria comprise a connection type criterion.

In an embodiment, the connection type criterion requires that the computing device is connected to a network using an unmetered connection.

In an embodiment, the connection type criterion requires that the computing device is connected to a network using a Wi-Fi connection.

In an embodiment, the request is transmitted to a content provider. One or more prefetched content items are received from the content provider in response to the request. The one or more prefetched content items are stored in a local cache of the computing device. At least some of the one or more prefetched content items are loaded from the local cache based on a determination that the software application has been foregrounded.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates example method associated with background prefetching of content items, according to an embodiment of the present disclosure.

Figure 1:
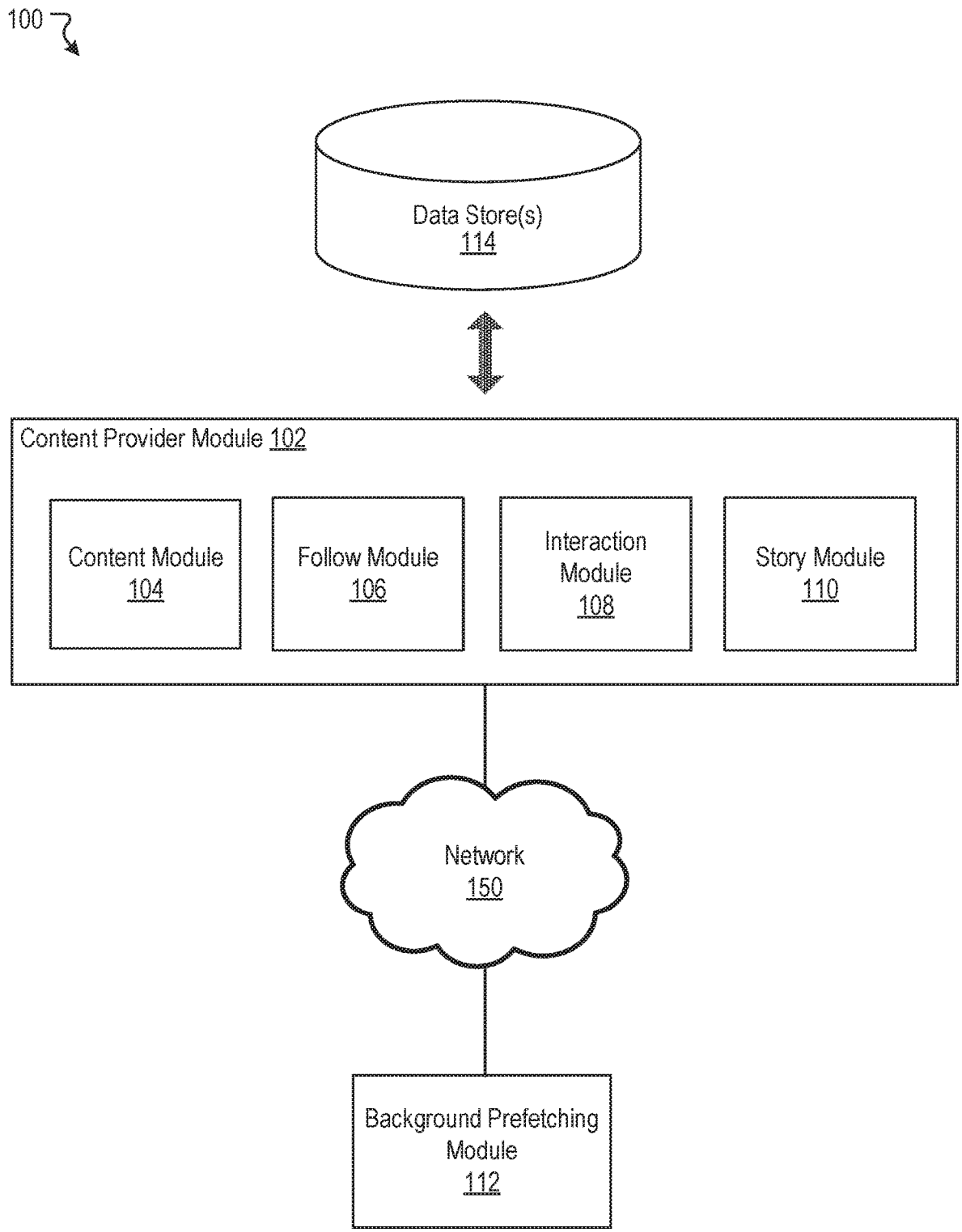
FIG. 1 illustrates an example system including a content provider module and a background prefetching module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

Under conventional approaches, a user typically interacts with the social networking system through a software application running on a computing device. This software application typically relies on a network connection (e.g., Internet connection) between the computing device and the social networking system. In some instances, such network connections may be interrupted for a number of reasons. In such instances, the software application is generally unable to operate as intended. For example, the user may no longer be able to access (e.g., view) content through the software application. Such restrictions can negatively impact the ways in which users interact with one another in the social networking system. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In general, a determination can be made that a user is interacting with a software application on a computing device. The software application can be configured to provide access to content items received from a content provider, for example, using a network connection. For example, the software application can be a social networking system application running on a user mobile device for providing access to content received from a social networking system. A determination can be made that the user has stopped interacting with the software application. For example, the user may have "backgrounded" the software application such that a different software application or an operating system interface (e.g., a home screen) is presented on a display associated with the computing device. While the user is not interacting with the software application, one or more content items associated with the software application can be downloaded and stored locally on the user's computing device. Download and local storage of content items associated with a software application while a user is not interacting with the software application (e.g., while the software application is backgrounded) may be referred to as prefetching. In one embodiment, prefetching can occur based on one or more prefetching criteria being satisfied. The one or more prefetched content items, having been downloaded, are now available locally for presentation within the software application the next time the user accesses (i.e., "foregrounds") the software application. For example, even if the user foregrounds the software application while access to the content provider is unavailable (e.g., the computing device has no network connection or insufficient bandwidth), the software application can still present the one or more prefetched content items. More details relating to the disclosed technology are provided below.

FIG. 1 illustrates an example system 100 including a content provider module 102 and a background prefetching module 112, according to an embodiment of the present disclosure. As shown in the example of FIG. 1, the content provider module 102 can include a content module 104, a follow module 106, an interaction module 108, and a story module 110. In some instances, the example system 100 can include at least one data store 114. The background prefetching module 112 can interact with the content provider module 102 over one or more networks 150 (e.g., the Internet, a local area network, etc.). The background prefetching module 112 can be implemented in a software application (e.g., a social networking application) running on a computing device. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 and/or the background prefetching module 112 can be implemented in any suitable combinations.

In some embodiments, the content provider module 102 and/or the background prefetching module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 and/or the background prefetching module 112 can be, in part or in whole, implemented as software running on one or more computing devices or systems, such as on a server system or a client computing device. In some instances, the content provider module 102 and/or the background prefetching module 112 can be, in part or in whole, implemented within or configured to operate in conjunction with or be integrated with a social networking system (or service), such as a social networking system 630 of FIG. 6. Likewise, in some instances, the content provider module 102 and/or the background prefetching module 112 can be, in part or in whole, implemented within or configured to operate in conjunction with or be integrated with a client computing device, such as the user device 610 of FIG. 6. For example, the content provider module 102 and/or the background prefetching module 112 can be implemented as or within a dedicated application (e.g., app), a program, or an applet running on a user computing device or client computing system. The application incorporating or implementing instructions for performing functionality of the content provider module 102 and/or the background prefetching module 112 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data.

The content module 104 can be configured to provide users with access to content that is posted through a content provider (e.g., a social networking system). For example, the content module 104 can provide a first user with access to content items through an interface. This interface may be provided through a display of a computing device being accessed by the first user in which the background prefetching module 112 is implemented. The first user can also interact with the interface to post content items to the social networking system. Such content items may include text, images, audio, and videos, for example. For example, the first user can submit a post to be published through the social networking system. In some embodiments, the post can include, or reference, one or more content items.

In various embodiments, other users of a social networking system can access content items posted by the first user. In one example, the other users can access the content items by searching for the first user by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include emoji-based reactions to a content item (e.g., selecting an option that corresponds to a particular reaction emoji, e.g., happy, sad, angry, etc.) and re-sharing a content item, for example. In some embodiments, such information can be stored in a social graph as described in reference to FIG. 6.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., after 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the background prefetching module 112 is configured to provide functionality for providing access to content provided by the content provider module 102 even when network access is interrupted (e.g., network 150 is inaccessible). More details regarding the background prefetching module 112 will be provided below with reference to FIG. 2.

Figure 2:
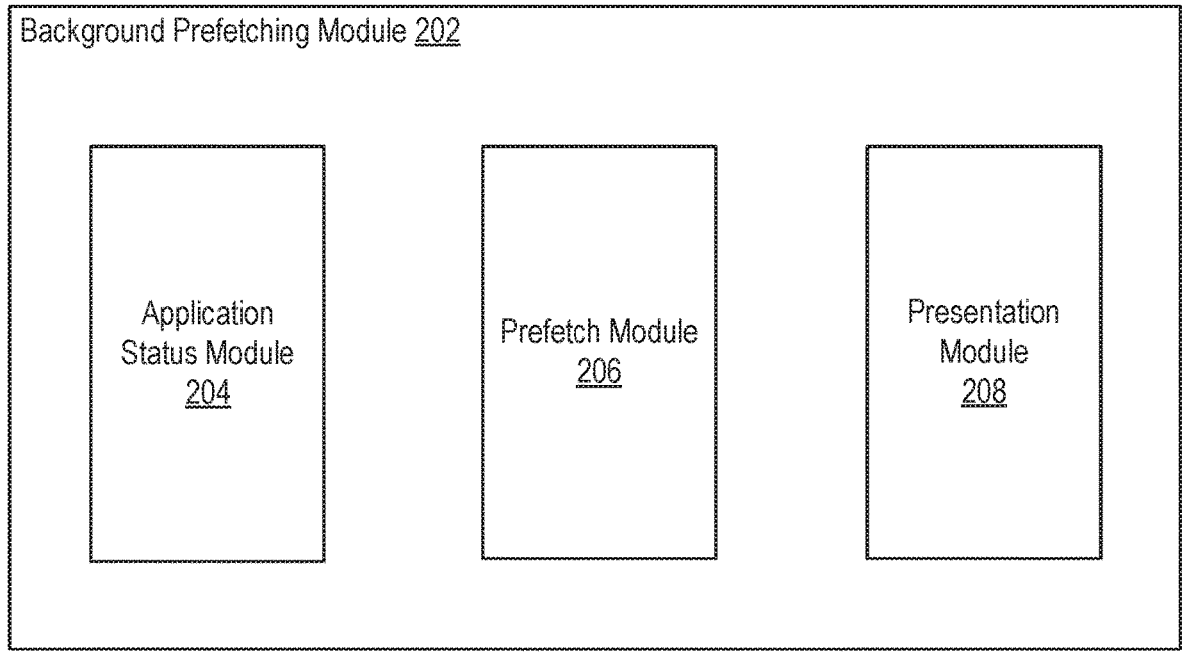
FIG. 2 illustrates an example background prefetching module, according to an embodiment of the present disclosure.

FIG. 2 illustrates an example background prefetching module 202 according to an embodiment of the present disclosure. In some embodiments, the background prefetching module 112 of FIG. 1 can be implemented as the background prefetching module 202. As shown in the example of FIG. 2, the background prefetching module 202 can include an application status module 204, a prefetch module 206, and a presentation module 208. The background prefetching module 202 may be implemented in a software application (e.g., social networking application) running on a computing device.

The application status module 204 can be configured to determine a status of a software application running on a computing device. In some embodiments, the application status module 204 can be configured to determine whether or not a user is interacting with the software application. In an embodiment, the application status module 204 can be configured to determine whether the software application has been backgrounded or foregrounded. A software application being backgrounded may be indicative of the user not interacting with the software application, while a software application being foregrounded may be indicative of the user interacting with the software application. For example, the computing device may be a mobile device, and the software application may be a social networking system application running on the mobile device. In certain instances, the mobile device may be configured such that at any given time, one software application is presented on a display of the mobile device, i.e., foregrounded, while other software applications are backgrounded. A user can background a software application by selecting an option (e.g., a button or an icon) associated with a home screen, an option associated with a different software application, and/or an option associated with turning off the mobile device display, to name some examples. For example, if a user opens a first software application, the application status module 204 can determine that the first software application has been foregrounded. If the user subsequently selects an option to navigate to a home screen, or an option to navigate to a different software application, or an option to turn off the mobile device display, the application status module 204 can determine that the first software application has been backgrounded.

The prefetch module 206 can be configured to request and download, from a content provider, content items for a software application while a user is not interacting with the software application. The prefetch module 206 can store the downloaded content items locally on a computing device (e.g., on a local cache). As mentioned above, downloading content items for a software application from a content provider while a user is not interacting with the software application can be referred to as prefetching. When content items are prefetched for a software application, user experience using the software application can be improved. For example, if a user opens a social networking system application, and then backgrounds the social networking system application, one or more content items can be prefetched for the social networking system application from a social networking system. The next time the user foregrounds the social networking system application, the one or more prefetched content items can be displayed very quickly, since they have already been downloaded and stored locally. The prefetched content items can be displayed substantially immediately while other content items are downloaded from the social networking system. Or, in another scenario, if the user foregrounds the social networking system while the user computing device's network connection is interrupted, the one or more prefetched content items can still be displayed and presented to the user, as they have already been downloaded and do not require a network connection to display.

In certain embodiments, the prefetch module 206 can initiate a prefetch operation based on satisfaction of one or more prefetch criteria. In one embodiment, the prefetch criteria can include a minimum background time threshold. The minimum background time threshold may represent a minimum amount of time that a software application must be backgrounded before a prefetch operation can be initiated. In other words, the prefetch module 206 can only initiate a prefetch operation after the software application has been backgrounded for the threshold amount of time. For example, if the minimum background time threshold is 10 minutes, the prefetch module 206 will only initiate a prefetch operation if the software application has been backgrounded for at least 10 minutes. When the software application is foregrounded again, a background timer can be reset, and the background timer can restart the next time the software application is backgrounded.

In one embodiment, the minimum background time threshold can be set to a predetermined default value (e.g., 10 minutes). In another embodiment, the minimum background time threshold can be computed dynamically. For example, in an embodiment, the minimum background time threshold can be customized based on user characteristics. For example, the minimum background time threshold can be computed as a percentage of an average amount of time between active sessions for a user, i.e., the average amount of time between when a user backgrounds a software application and then subsequently foregrounds the software application. Consider an example scenario in which a user, on average, waits twenty minutes between active sessions on a software application. In other words, when the user backgrounds the software application, it will be, on average, twenty minutes before the user foregrounds the software application again. The minimum background time threshold can be defined as a percentage of the average time between active sessions, e.g., 75%. In this example scenario, the minimum background time threshold would be 75% of 20 minutes, i.e., 15 minutes. In certain embodiments, the computation of the average time between active sessions can exclude outliers to account for extended periods of inactivity, such as when a user is sleeping. For example, any periods of inactivity that are more than a selected number of standard deviations (e.g., one standard deviation) away from the mean can be excluded from the average time computation.

In one embodiment, the prefetch criteria can include a connection type criterion (or criteria). In a more particular embodiment, the connection type criterion may specify a requirement that the user computing device is connected to a network using an unmetered connection. For example, the connection type criterion may specify that a prefetch operation can only be initiated if the computing device is connected to a network using a Wi-Fi connection. By implementing this requirement, it can be assured that a user's limited, metered data (e.g., cellular data that may have monthly maximums) is not overly taxed by prefetching operations.

If it is determined that all prefetch criteria are satisfied, the prefetch module 206 can initiate and carry out a prefetch operation. The prefetch operation can comprise transmitting a request to a content provider for one or more content items associated with a software application, and receiving one or more content items from the content provider in response to the request. Based on a determination that all prefetch criteria are satisfied, the prefetch module 206 can send a request to a content provider for one or more content items associated with a software application. For example, the prefetch module 206 can transmit a request to a social networking system for one or more content items to be presented in a social networking system application. In one embodiment, the one or more content items may correspond to a plurality of different content types for presentation in a plurality of feeds. For example, as discussed above, a social networking system application may include a main feed for presenting a first set of content items, and a story feed for presenting a second set of content items (e.g., one or more stories). The prefetch module 206 can generate and transmit a request which requests content items for a plurality of different feeds. For example, the request can relate to one or more content items for the main feed and one or more content items for the story feed. The request for content items in a plurality of feeds can be bundled into a single operation. Bundling these requests into a single operation, rather than having multiple requests being sent at different times, can help to conserve computing resources, such as battery power and transmission bandwidth. In an embodiment, transmission of a prefetch request and receipt of prefetched content items can occur asynchronously. In one embodiment, the prefetch module 206 can limit prefetch operations to a selected number of prefetch operations for each period of inactivity. For example the prefetch module 206 can limit prefetch operations to a single prefetch operation for each period of inactivity. In other words, in this example, each time that a user backgrounds a software application, the prefetch module 206 transmits to a content provider only one request for one or more prefetched content items until the software application is foregrounded again. Once the prefetch operation is completed (i.e., a request for content items is transmitted, and one or more content items are received in response to the request), the prefetch operation can be terminated until the next time the user backgrounds the software application. In one embodiment, the content items received in response to a prefetch operation may be substantially similar and/or identical to the content items that would have been received had the user been interacting with the software application at the time of the prefetch request.

The presentation module 208 can be configured to present content items within a software application running on a computing device. The content items may be presented on a display associated with the computing device. Content items presented to a user can include prefetched content items. When a user foregrounds a software application, the presentation module 208 can be configured to load and render content items associated with the software application for presentation to the user. If one or more content items are prefetched and stored locally on the computing device, the one or more prefetched content items can be presented to the user even if the computing device's network connection is interrupted or disabled. In such instances, a user can open (e.g., foreground) a software application, and view and/or interact with the one or more prefetched content items as if the prefetched content items are being received over an active network connection. In certain instances, content items that are prefetched may be presented to a user for only a short period of time, or not presented to a user at all. For example, if one or more content items are prefetched, and a user at a later time foregrounds the software application while the computing device has an active network connection, the software application may retrieve newer content items from the content provider via the active network connection, such that at least some of the one or more prefetched content items are never presented to the user. In other instances, such as when the user foregrounds the software application shortly after the prefetched content items have been received, the prefetched content items can be presented to the user while other content items are being received from the content provider.

Figure 3:
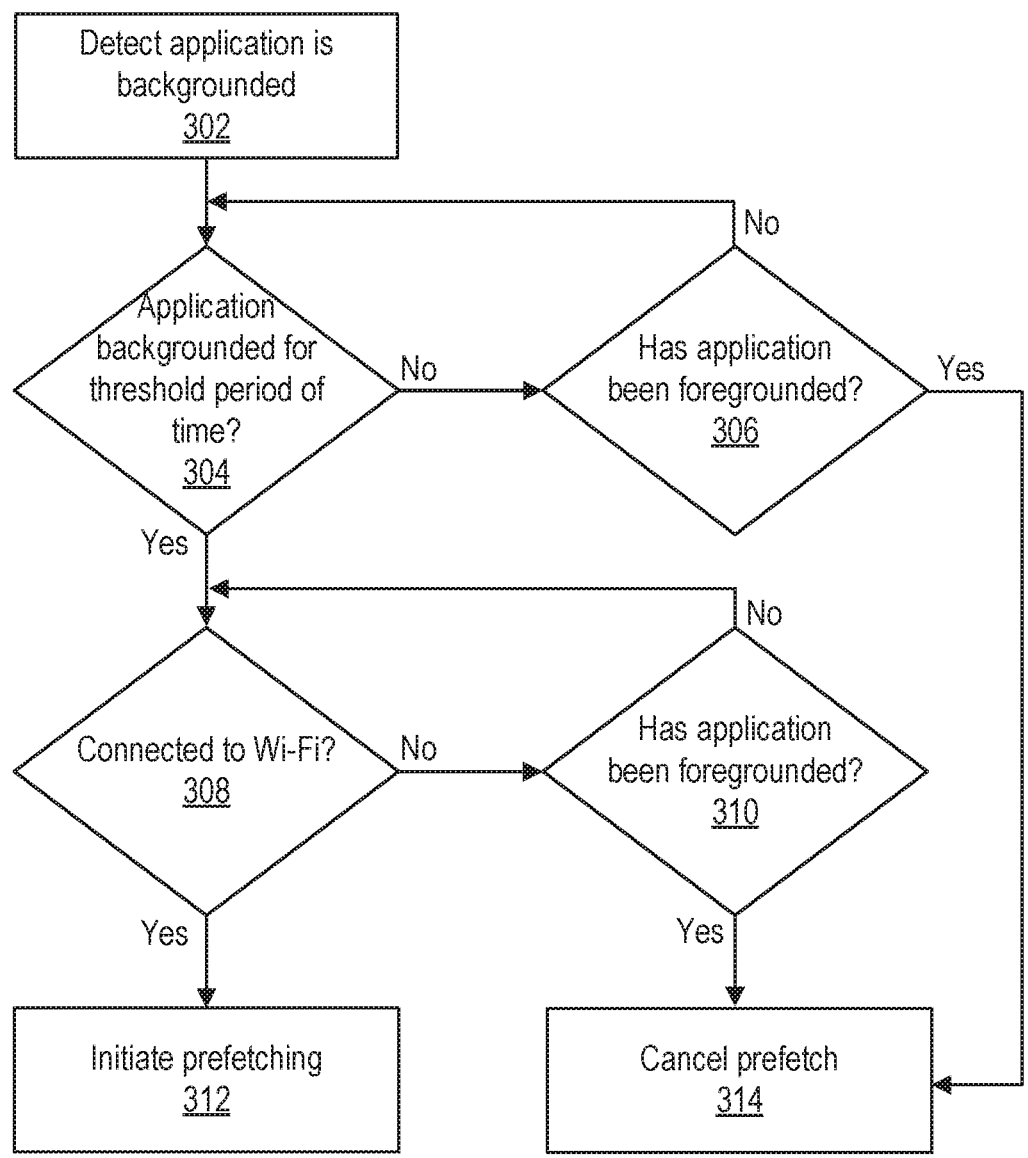
FIG. 3 illustrates an example flow diagram associated with background prefetching of content items, according to an embodiment of the present disclosure.

FIG. 3 illustrates an example flow diagram 300 associated with background prefetching of content items, according to an embodiment of the present disclosure. The functional block diagram 300 may represent steps that are taken, for example, by the background prefetching module 112. At block 302, it is detected that a software application has been backgrounded. At block 304, a determination is made as to whether or not the software application has been backgrounded for a threshold period of time. If the software application has not been backgrounded for the threshold period of time, the functional block diagram 300 enters into a loop waiting for the time threshold to be satisfied. If, during this waiting period, the application becomes foregrounded at block 306, the prefetch operation is canceled at block 314. If the time threshold is satisfied, the functional block diagram 300 moves to block 308, where a determination is made as to whether or not a computing device is connected to Wi-Fi. If the computing device is not connected to Wi-Fi, the functional block diagram 300 once again enters into a loop waiting for the computing device to be connected to Wi-Fi. If, during this waiting period, the application becomes foregrounded at block 310, the prefetch operation is canceled at block 314. However, if the computing device is connected to Wi-Fi, then both a time threshold criterion (block 304) and a connection type criterion (block 308) are satisfied, and a prefetch operation is initiated at block 312. For example, a request for one or more content items can be generated and transmitted to a content provider.

FIG. 4 illustrates an example method 400 associated with background prefetching of content items, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can determine that a software application running on a computing device has been backgrounded. At block 404, the example method 400 can determine that one or more prefetch criteria is satisfied. At block 406, the example method 400 can generate a request to prefetch one or more content items for the software application based on determination that the one or more prefetch criteria is satisfied.

Figure 5:
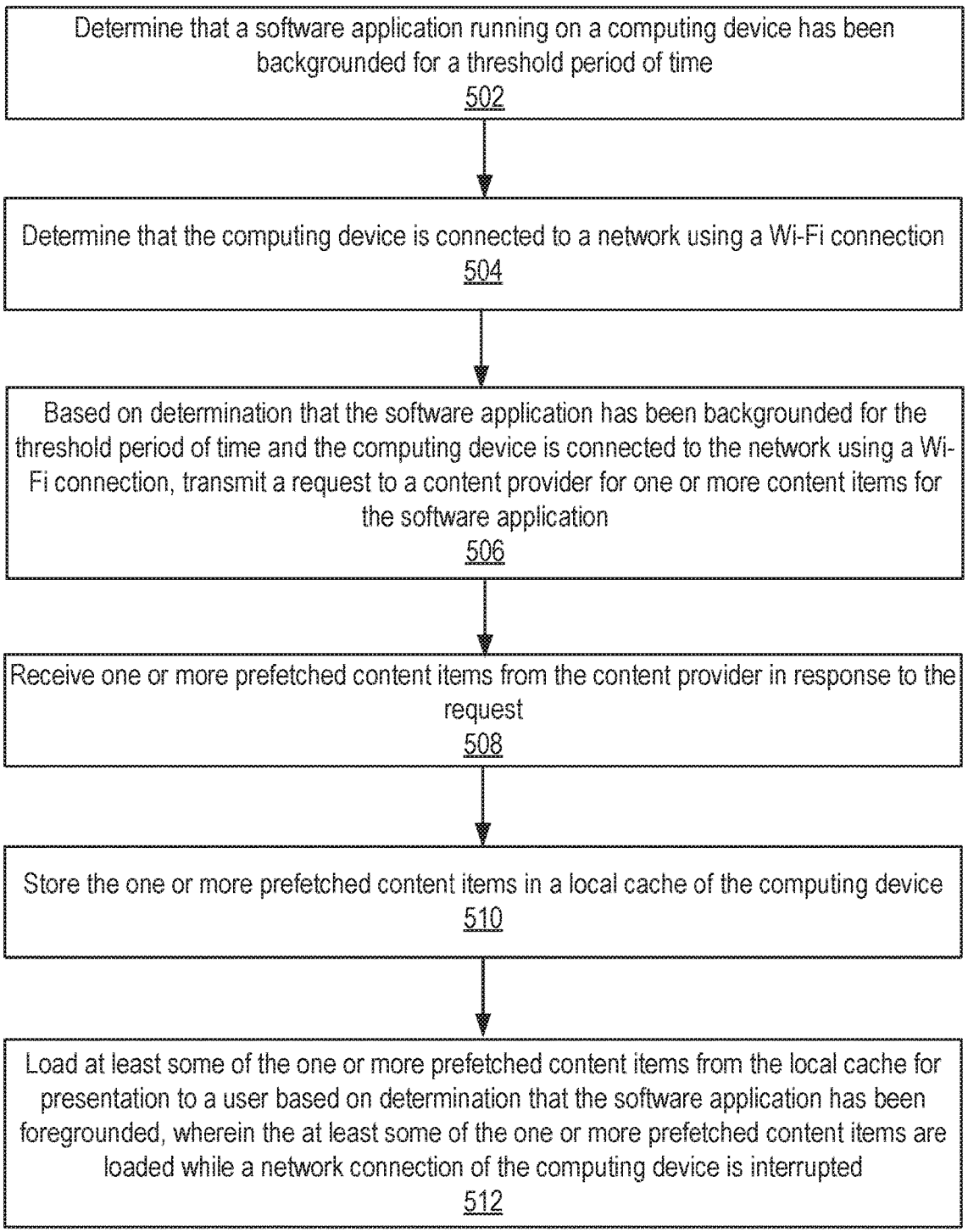
FIG. 5 illustrates another example method associated with background prefetching of content items, according to an embodiment of the present disclosure.

FIG. 5 illustrates an example method 500 associated with background prefetching of content items, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can determine that a software application running on a computing device has been backgrounded for a threshold period of time. At block 504, the example method 500 can determine that the computing device is connected to a network using a Wi-Fi connection. At block 506, the example method 500 can, based on determination that the software application has been backgrounded for the threshold period of time and the computing device is connected to the network using a Wi-Fi connection, transmit a request to a content provider for one or more content items for the software application. At block 508, the example method 500 can receive one or more prefetched content items from the content provider in response to the request. At block 510, the example method 500 can store the one or more prefetched content items in a local cache of the computing device. At block 512, the example method 500 can load at least some of the one or more prefetched content items from the local cache for presentation to a user based on determination that the software application has been foregrounded, wherein the at least some of the one or more prefetched content items are loaded while a network connection of the computing device is interrupted.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
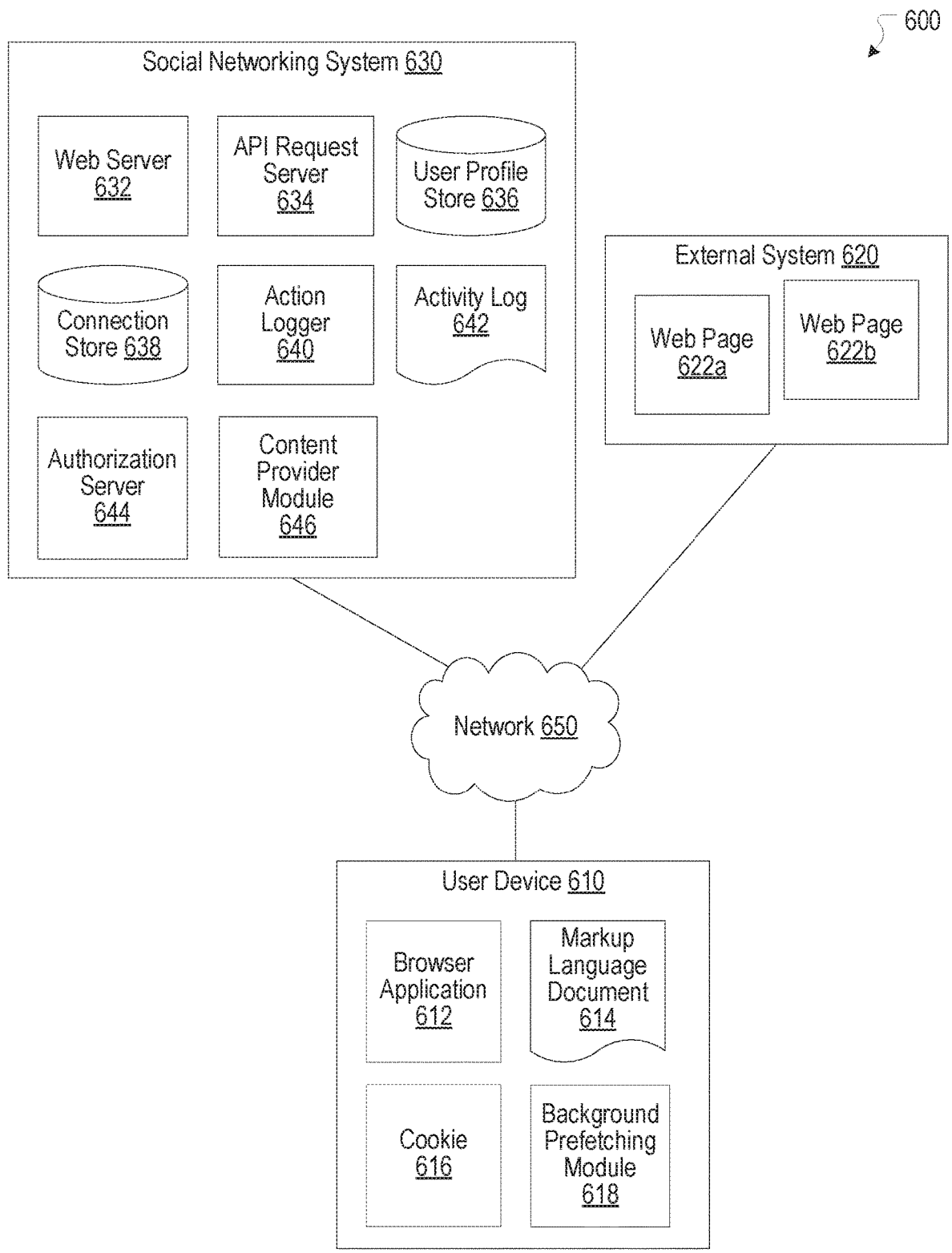
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, one or more functionalities of the content provider module 646 can be implemented in the user device 610. In some embodiments, the user device 610 can include a background prefetching module 618. The background prefetching module 618 can, for example, be implemented as the background prefetching module 112, as discussed in more detail herein. In some embodiments, one or more functionalities of the background prefetching module 618 can be implemented in the social networking system 630. As discussed previously, it should be appreciated that there can be many variations or other possibilities.

Hardware Implementation

Figure 7:
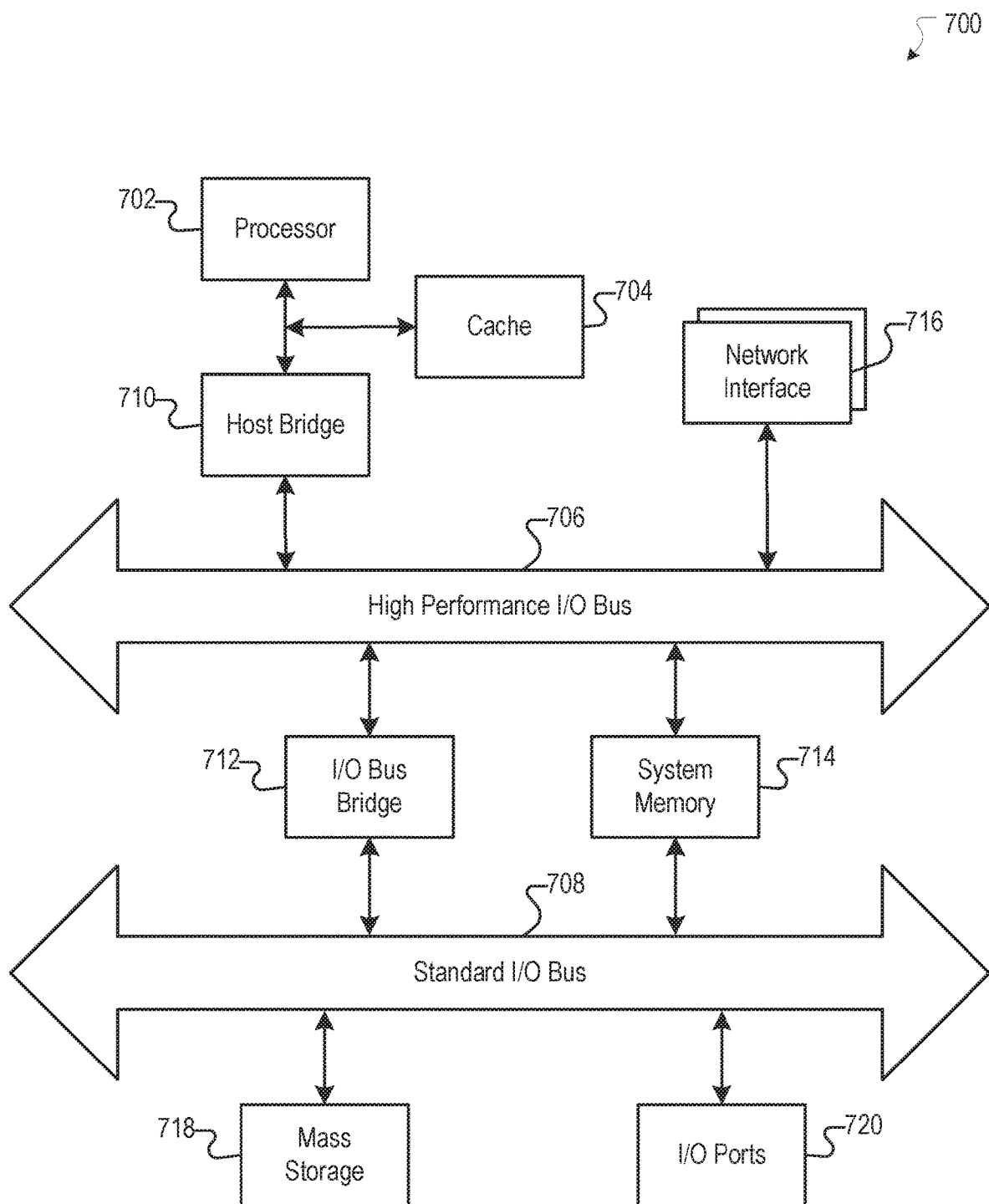
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a software application has been backgrounded;
   determining, by the computing system, that prefetch criteria are satisfied, wherein the prefetch criteria comprise at least a minimum background time threshold specifying a minimum amount of time the software application must be backgrounded before a prefetch request can be initiated, wherein the minimum background time threshold is computed dynamically based on a computation of an average amount of time between active sessions on the software application and excludes outlier periods of inactivity, wherein the outlier periods of inactivity are determined based on a selected number of standard deviations; and
   generating, by the computing system, a request to prefetch one or more content items for the software application based on a determination that the prefetch criteria are satisfied.

2. The computer-implemented method of claim 1, wherein the request to prefetch one or more content items for the software application comprises a request to prefetch a plurality of content items for a plurality of feeds associated with the software application.

3. The computer-implemented method of claim 1, wherein the prefetch criteria further comprise a connection type criterion.

4. The computer-implemented method of claim 3, wherein the connection type criterion requires a connection to a network using an unmetered connection.

5. The computer-implemented method of claim 3, wherein the connection type criterion requires a connection to a network using a Wi-Fi connection.

6. The computer-implemented method of claim 1, further comprising:
   transmitting the request to a content provider;
   receiving one or more prefetched content items in response to the request;
   storing the one or more prefetched content items; and
   loading at least some of the one or more prefetched content items based on a determination that the software application has been foregrounded.

7. A system comprising:
   at least one processor; and
   a memory storing instructions that, when executed by the at least one processor, cause the system to perform a method comprising:
   determining that a software application has been backgrounded;
   determining that prefetch criteria are satisfied, wherein the prefetch criteria comprise at least a minimum background time threshold specifying a minimum amount of time the software application must be backgrounded before a prefetch request can be initiated, wherein the minimum background time threshold is computed dynamically based on a computation of an average amount of time between active sessions on the software application and excludes outlier periods of inactivity, wherein the outlier periods of inactivity are determined based on a selected number of standard deviations; and
   generating a request to prefetch one or more content items for the software application based on a determination that the prefetch criteria are satisfied.

8. The system of claim 7, wherein the request to prefetch one or more content items for the software application comprises a request to prefetch a plurality of content items for a plurality of feeds associated with the software application.

9. A non-transitory computer-readable storage medium including instructions that, when executed by at least one processor of a computing system, cause the computing system to perform a method comprising:
   determining that a software application has been backgrounded;
   determining that prefetch criteria are satisfied, wherein the prefetch criteria comprise at least a minimum background time threshold specifying a minimum amount of time the software application must be backgrounded before a prefetch request can be initiated, wherein the minimum background time threshold is computed dynamically based on a computation of an average amount of time between active sessions on the software application and excludes outlier periods of inactivity, wherein the outlier periods of inactivity are determined based on a selected number of standard deviations; and
   generating a request to prefetch one or more content items for the software application based on a determination that the prefetch criteria are satisfied.

10. The non-transitory computer-readable storage medium of claim 9, wherein the request to prefetch one or more content items for the software application comprises a request to prefetch a plurality of content items for a plurality of feeds associated with the software application.

11. The system of claim 7, wherein the prefetch criteria further comprise a connection type criterion.

12. The system of claim 11, wherein the connection type criterion requires a connection to a network using an unmetered connection.

13. The system of claim 11, wherein the connection type criterion requires a connection to a network using a Wi-Fi connection.

14. The system of claim 7, wherein the instructions, when executed by the at least one processor, cause the system to further perform:
   transmitting the request to a content provider;
   receiving one or more prefetched content items in response to the request;
   storing the one or more prefetched content items; and
   loading at least some of the one or more prefetched content items based on a determination that the software application has been foregrounded.

15. The non-transitory computer-readable storage medium of claim 9, wherein the prefetch criteria further comprise a connection type criterion.

16. The non-transitory computer-readable storage medium of claim 15, wherein the connection type criterion requires a connection to a network using an unmetered connection.

17. The non-transitory computer-readable storage medium of claim 15, wherein the connection type criterion requires a connection to a network using a Wi-Fi connection.

18. The non-transitory computer-readable storage medium of claim 9, wherein the instructions, when executed by the at least one processor, cause the computing system to further perform:
   transmitting the request to a content provider;

receiving one or more prefetched content items in response to the request;

storing the one or more prefetched content items; and loading at least some of the one or more prefetched content items based on a determination that the software application has been foregrounded.

\* \* \* \* \*